Oct. 11, 1966  R. J. ROWEKAMP  3,277,884
PAN-TYPE SOLAR COLLECTOR
Filed Nov. 2, 1964
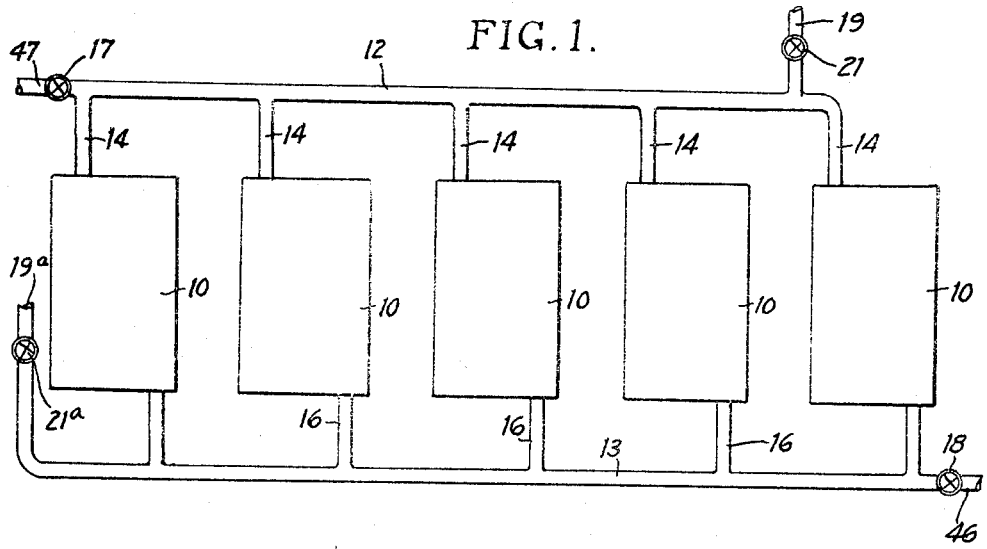
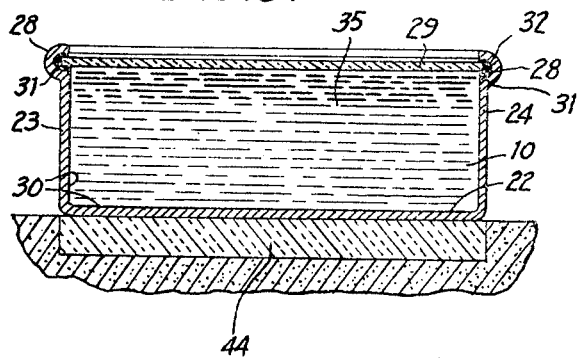
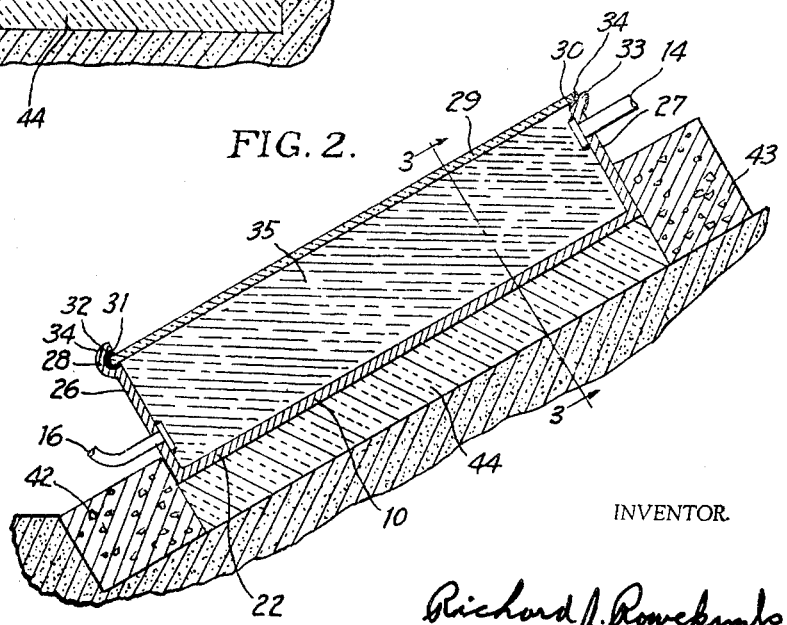
INVENTOR.
Richard J. Rowekamp

United States Patent Office 3,277,884
Patented Oct. 11, 1966

3,277,884
PAN-TYPE SOLAR COLLECTOR
Richard J. Rowekamp, 440 Hilltop Lane, Cincinnati, Ohio
Filed Nov. 2, 1964, Ser. No. 407,974
2 Claims. (Cl. 126—271)

This application is a continuation-in-part of my co-pending application Serial No. 274,748, filed April 22, 1963, now abandoned.

This invention relates to a pan-type solar collector for accumulating heat and energy from the sun. More particularly, this invention relates to a tray or pan and to a system of pans having transparent panels exposed to the sun for accumulating heat therein.

The is a great need in the world for harnessing the energy of the sun. The U.S. Government recognizes the fact that our fossil fuels are being depleted, and is spending billions of dollars trying to discover new sources of energy; but unfortunately it ignores the solar sciences, and spends most of this research money on developing atomic energy in processes which involve the fission of uranium and the fusion of hydrogen. However, success with atomic energy has come disappointingly slow, and this country has not yet found a permanent solution to its future energy problems; meanwhile, the rest of the world hasn't even found a temporary solution. Indeed, the entire continents of Africa, South America, and Australia have virtually no coal or oil, and have little chance of developing industrially because of this lack of fuel. Large parts of Asia and Europe have no coal or oil, and their industrial progress is likewise hampered. Even the United States may not be able to meet its energy demands two centuries hence, because of our vast consumption of fossil fuels. Therefore, the need for developing the solar sciences is becoming more urgent with each passing year; and the United States could benefit immensely through their development because there are nearly one billion acres in our West which receive abundant sunlight all year round. The solar collector described in this invention could supply 25% of the West's total energy requirements by furnishing cheap hot water for house-heating and domestic needs such as laundry, dishwashing, and baths.

If the sun is to provide cheap energy for human society, solar collectors must be perfected which are cheap, durable, and efficient. A group of scientists, who are operating solar stills for the U.S. Government in Florida, estimate that collectors must be built which cost no more than one dollar per square foot and which have a life expectancy of thirty to fifty years; and then perhaps solar energy will become competitive with conventional fuels; in their particular field, these scientists recognize that concrete and glass are two materials which meet the above requirements. Other experts in the energy business in the U.S. have tried to prophesy that, if and when cheap solar energy does arrive, it will be in the field of making hot water from sunlight and using this hot water for house-heating and other domestic needs. Until very recently, the solar sciences have been so neglected that no one would attempt to outline the exact nature of the devices which would provide this hot water.

However, there have been a few early solar inventors who have firmly established certain basic principles which will form the basis of all future solar water heaters. Most of the patents covering these basic principles are now in public domain.

If progress is to come in the development of solar water heaters, designs must become simpler, new and better materials must be found, and, more particularly, the heaters must have a higher efficiency.

Tests, conducted with the pan-type solar collector described in this invention, indicate that this device will come close to producing cheap competitive hot water from sunlight, because (1) all components are cheap in cost and easy to manufacture; (2) because all materials are durable and can last as long as thirty years; and (3) because it has an initial efficiency of probably 60%, which is about double the efficiency of the solar stills being operated in Florida. The 60% initial efficiency is easy to explain, because the heat in the solar stills is held in the water day and night, and considerable heat losses occur as a result of convection and reradiation; on the other hand, the hot water made in the pan-type collector can be used almost immediately after it is raised to the desired temperature, or can be stored in an insulated tank where heat losses are drastically reduced; therefore, a net efficiency of 50% is often possible. The maximum solar energy gathered in the solar collector to date in Cincinnati has been 1800 B.t.u./sq. ft./day, and it is estimated that the sun delivered approximately 2400 B.t.u./sq. ft. during the same sunlight period. It is further estimated that, in southern Arizona and California, where there is abundant sunlight, that one acre of these solar collectors could heat so much hot water in one year that it would require one thousand tons of coal to heat an equivalent amount; and in one hundred years, one acre of these collectors would yield the equivalent of one hundred-thousand tons of coal Because of its cheap cost and rust-resistant characteristics, aluminum would be a valuable metal for use in a solar water heater—if a permanent black surface could be applied to it at reasonable costs. There are two known methods of applying a black surface to aluminum; in both methods, an aluminum body is first anodized; then in one process, the white oxidized surface is blackened with a dye which is absorbed by the surface; in the second process, the anodized aluminum is immersed in a copper nitrate solution, and then heated to about 450° C., and a dark precipitate forms on top of the anodized coating. However, neither of these two black surfaces are satisfactory: a dye will fade out when exposed to sunlight, and sooner or later the aluminum surface will reflect rather than absorb the sun's rays; the copper nitrate treatment of anodized aluminum results in extremely high costs.

There are two new methods for obtaining "black" aluminum that result in a permanent finish; and it is an object of this invention to describe these two methods; also to report that black porcelain enamel is an excellent metal for use in a solar collector, and is just as desirable as "black" aluminum, because it has outstanding qualities for absorbing and conducting solar radiation.

An extremely cheap way of obtaining a black finish on the interior of an aluminum pan-type solar collector has been discovered recently, and the method has been previously described in my applications Serial Nos. 306,640, filed September 4, 1963, 318,123, filed October 22, 1963, and 364,236, filed May 1, 1964. In this first of the two new methods mentioned above, the sun provides a black surface at virtually no expense. The combination which has produced black aluminum by the action of sunlight and water is as follows: (1) an aluminum pan, containing alloys of 2% silicon and 1% manganese, is exposed to sunlight and covered with a glass panel which causes the water in it to be heated to a rather high temperature; (2) the pan is filled with water which contains small quantities of chlorine and fluoride; (3) during the normal course of use, the portion of the aluminum pan exposed to sunlight and water will turn "black." The addition of larger quantities of chlorine and/or fluoride will help deepen the black color, as will a few batches of salt water run through the pans during the first few days they are exposed to sunlight. The exact phenomena of what causes this "blackening effect" isn't thoroughly understood, but the following explanation is offered: since the aluminum contains silicon, it is believed that sunlight is generating small currents of electricity when it strikes the inside of the pan; the ability of silicon to generate electricity directly from sunlight has been known to scientists for a good number of years, and they have described it as a photoelectric effect. Therefore, it seems possible that the sun is giving the inside of the aluminum pan a free anodizing job, with the silicon and manganese alloys causing the blackening effect, and with the chlorine and fluoride (or salt water) acting as the electrolyte. The aluminum pan becomes black only throughout the portion that is immersed in water. The anodizing process described next helps to further explain what is happening.

The second new method for obtaining a permanent black surface on aluminum involves, partly, the art of metallurgy; and the black surface results as a direct action of the procss of electrolysis called anodizing. In the old process of anodizing, as related earlier, the aluminum is first anodized through electrolysis, and after a white oxide layer is formed, a black dye or copper nitrate precipitate is added to the anodized aluminum. In this new method, a black anodized coating is a direct result of the anodizing process, and no after-coating is required. The new procedure is as follows: an aluminum body containing 1% silicon and 1% manganese alloys is immersed in a solution of 5% sulfuric acid, and an electric current is passed through the solution; the aluminum body acts as the anode, the sulfuric acid as the electrolyte, and the lead tank which contains the acid is the cathode. The temperature is kept at about 72° F. A permanent black anodized coating is deposited on the aluminum body.

Another object of this invention is to combine a number of cheap and durable materials together to make a solar water heater of simple design which can be manufactured and installed in the field for a cost of approximately one to two dollars per square foot. One of the reasons why such a cost is possible is because three of the major components—aluminum, glass, and insulation—can be purchased for seventeen cents per square foot each, making the major material cost only about fifty cents. Of course, it is necessary to buy in large quantities in order to obtain such prices.

Another object of this invention is to provide thermal insulation at the base and sides of the pans to prevent heat losses. For this purpose, either polyurethane resin insulation material or asphalt impregnated structural fiberglass is provided for the base of the pans, and prefabricated lightweight concrete blocks for the sides. All materials have tested satisfactorily during the past year in the arrangement as shown in the drawing; however, it is to be pointed out that the arrangement of the concrete blocks need not be exactly as shown in the drawing, but could cover the sides all the way to the top of the pans. The fiberglass insulation specified comes in board-form, and is manufactured in 1' x 3' slabs, 1" thick, and is used in the construction industry for such things as perimeter insulation in a house. The lightweight prefabricated concrete blocks are manufactured by mixing together Portland cement and a lightweight aggregate called perlite, which is a processed volcanic ash.

Another object of this invention is to provide a piping arrangement whereby a group of pans can be filled with water through the use of one control valve, and drained of heated water through the use of one control valve. This is an important feature of the invention because it helps to reduce the total cost of the solar collectors.

A further object of this invention is to provide a device of this type in which the transparent panel faces the sun at an appropriate angle to the horizontal. For this purpose it is felt that the most permanent type of arrangement would be to move earth with a bulldozer, or other earth-moving equipment, so that the ground slants toward the sun. Once this is accomplished, the earth would remain in the same stationary position, possibly for centuries, and would be far more stable than wood or steel supports. The pan-type solar collector and other related materials would then rest directly upon the graded earth.

The obvious object of this invention is to provide a pan adapted to hold water beneath a transparent panel, with the panel facing toward the sun so that heat energy from the sun is accumulated to heat the water.

The above and other objects and features of the invention will be apparent to those skilled in the art to which this invention pertains from the following detailed description, and the drawing, in which:

FIG. 1 is a schematic view showing an arrangement of pans for accumulating heat constructed in accordance with an embodiment of this invention;

FIG. 2 is an enlarged view in lengthwise section of one of the pans and support therefor; and FIG. 3 is a view in section taken on the line 3—3 in FIG. 2.

In the following detailed description and the drawing, like reference characters indicate like parts.

In FIG. 1 is shown a bank of pans 10 provided with a main inlet header 12 and an outlet header 13. The inlet header 12 is connected to each of the pans by means of a short inlet line or pipe 14. The outlet header is connected to each of the pans by a short outlet line or pipe 16. A valve 17 in the inlet header and a valve 18 in the outlet header control flow of water to and from the pans. A vent line 19 is provided in communication with the inlet header and is controlled by a valve 21; and in the outlet header a vent line 19a is provided and is controlled by a valve 21a.

Details of construction of one of the pans 10 are shown in FIGS. 2 and 3. The pan 10 includes a main body having a bottom panel 22, side wall panels 23 and 24, a lower wall 26 (FIG. 2) and an upper wall 27. At the upper edges of the sides of the lower walls are provided inwardly opening grooved portions 28. A sheet 29 of glass is received in grooves 31 therein. An appropriate sealing material 32 such as a polysulphide resin polymer or the like in the groove surrounding the glass forms a seal between the glass and the side and lower walls of the pan. The upper wall is provided with a ledge portion 33. Sealing composition 34 between the sheet of glass and the ledge portion 33 completes the seal between the sheet of glass 29 and the walls of the pan. The inlet line 14 extends through the upper wall 27 to permit entry of water 35 into the pan, and the inlet line 14 can be attached to the upper wall by welding or soldering or the like. The outlet line 16 extends through the lower wall 26 and is attached thereto by welding or soldering or the like.

The pan is mounted with the sheet 29 of glass sloping at an appropriate angle so that the sheet of glass 29 is substantially perpendicular to rays of sunlight at or near meridian height, and the pan preferably slopes downwardly toward the south if in the Northern Hemisphere (toward the north if in the Southern Hemisphere). The pan is held in place between prefabricated blocks of lightweight insulating concrete 42 and 43, and the pan rests on a block 44 of an appropriate thermal insulating material such as a polyurethane resin or asphalt impregnated fiberglass which insulates the pan and prevents heat losses. The angle or slope is made by moving earth with a bulldozer so that the ground slants toward the sun.

The pan 10 is preferably formed of such metals as black aluminum or black porcelain enamel. The inner faces of the bottom and walls of the pan 10 are provided with a black or darkened inner face 30, which is formed on aluminum by any of the two new methods described earlier in the specification, or in the standard manner if it is porcelain enamel.

Water is introduced through the inlet header 12 and the inlet line 14 into the pan 10, and the water is permitted to remain in the pans until the water has been raised in temperature as desired, whereupon the outlet valve 18 (FIG. 1) and the air vent valves 21 and 21a can be opened to permit drainage of heated water from all the pans through the outlet header 13 to an outlet main 46 which can conduct the water to suitable apparatus (not shown) in which the heated water is used.

When the heated water has been drained from the pans, the drain valve 18 is closed, and an inlet valve 17 is opened to permit water from a main 47 to enter the inlet header 12 and flow therefrom through the inlet line 14 into all the pans 10.

The heat and energy accumulating device illustrated in the drawing and described above is subject to structural modification without departing from the spirit and scope of the appended claims.

Having described my invention, what I claim as new and desire to secure by Letters Patent, is:

1. A heat accumulator for collecting solar energy in a liquid, which comprises an aluminum alloy pan having a base, side walls and end walls extending upwardly from said base, a sheet of transparent material mounted on upper portions of the side and end walls spaced from the base to form an enclosed space therebetween, said aluminum alloy pan including 2% silicon and 1% manganese therein, means for mounting the pan with the transparent sheet facing the meridian sun, thermal insulation between the base of the pan and the mounting means, means for introducing water which contains small quantities of chlorine and fluoride into the pan so that it can be heated by the sun, and means for removing heated liquid from the pan, whereby during the normal course of use, the portion of the aluminum pan exposed to sunlight and water will turn black.

2. A heat accumulator for collecting solar energy in water, which comprises a series of aluminum alloy pans, thermal insulation beneath the base of the pan, a glass cover mounted on the upper portion of the pans, means for filling the pans with water which contains small quantities of chlorine and fluoride so that the entire assembly can be filled through the use of one control valve, and means for draining the pans of heated water so that the entire assembly can be emptied through the use of one control valve; said aluminum alloy pans including 2% silicon and 1% manganese therein, and with grooves on the upper edges of three side walls and a flat ledge portion on the fourth side wall; said thermal insulation to be either polyurethane resin or board-form fiberglass; the glass cover to be ordinary single or double-strength window glass mounted in the grooves and on the ledge of the pans, and sealed with polysulphide resin polymer sealing material; said filling means consisting of a short inlet pipe welded to the upper wall of the aluminum pans, and connected to an inlet header which has a valve which controls the flow of water to and from all the pans in the series; said emptying means consisting of a short outlet pipe welded to the lower wall of the aluminum pans, and connected to an outlet header which has a valve that controls the flow of water out of all the pans in the series; said inlet header and outlet header having an air vent line; said pan assembly sloping toward the approximate angle of the sun, and held in place by prefabricated lightweight concrete blocks, whereby during the normal course of use, the portion of the aluminum pan exposed to sunlight and water will turn black; and the means for mounting the pans facing the sun being graded sloping earth.

References Cited by the Examiner

UNITED STATES PATENTS

| | | | |
|---|---|---|---|
| 1,101,001 | 6/1914 | Willsie | 126—271 X |
| 1,240,890 | 9/1917 | Shuman et al. | 126—271 |
| 2,249,642 | 7/1941 | Turner | 126—271 |
| 2,519,281 | 8/1950 | Presser et al. | 126—271 |
| 2,917,817 | 12/1959 | Tabor. | |
| 3,052,228 | 9/1962 | Okuda | 126—271 |
| 3,076,450 | 2/1963 | Gough et al. | 126—271 |
| 3,145,707 | 8/1964 | Thomason | 126—271 |

FOREIGN PATENTS 1,023,132  12/1952  France.

CHARLES J. MYHRE, *Primary Examiner.*